Roberts & Hambly,
Cutting Dye Wood.
Nº 5,251. Patented Aug. 21, 1847.
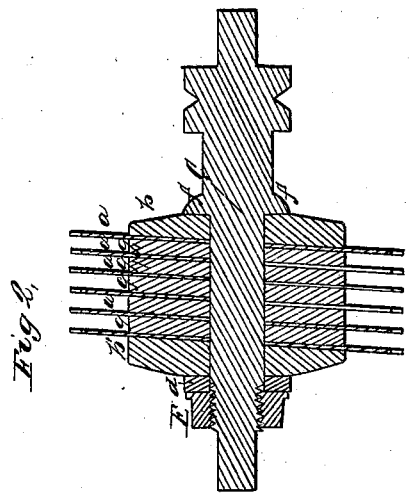
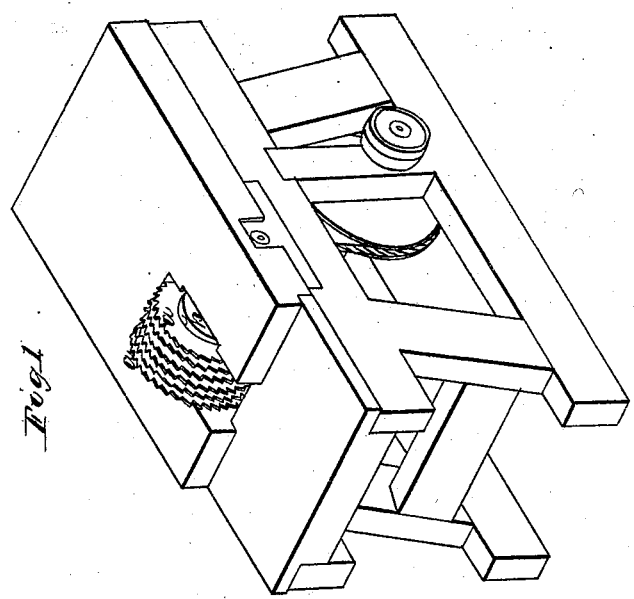

UNITED STATES PATENT OFFICE.

C. W. ROBERTS AND JNO. HAMBLY, OF PHILADELPHIA, PENNSYLVANIA.

MACHINERY FOR RASPING DYEWOODS.

Specification of Letters Patent No. 5,251, dated August 21, 1847.

*To all whom it may concern:*

Be it known that we, CHAS. W. ROBERTS and JOHN HAMBLY, of the city and county of Philadelphia and State of Pennsylvania, have invented a new and Improved Machine for Rasping Dyewoods, Roots, Bark, &c., into powder; and we do hereby declare the following to be a full, clear, and exact description thereof, reference being had to the accompanying drawings, making a part of this specification, in which—

Figure 1, is a perspective view, and Fig. 2, a section of the rasping wheel detached from the machine.

The rasping wheel in our machine is composed of a series of circular saws, a, a, secured to a shaft C, in such a manner as to give them an oblique inclination to the same; as represented in Fig. 2, so that as they are revolved, the rasping action of the saws will operate on the wood to the right during one half the revolution of the saws, and to the left during the other half. By means of this arrangement of the saws, they can be placed at a very considerable distance from each other, and yet their teeth will operate upon the entire surface of the substance placed in contact therewith. This arrangement of the saws also serves to prevent any particles from adhering to, and clogging the teeth of the same.

The saws a, a, are secured to the shaft C, as follows: f, is a shoulder on the shaft C; a circular metallic plate b, having an aperture in its center, is passed on to the shaft, resting against the shoulder f; a circular saw is then placed upon the shaft resting against the plate b; a circular dividing plate g, is next placed upon the shaft, and then another saw, and so on, until all the saws, and division plates have been placed upon the shaft; a circular plate b', corresponding in shape and size with the plate b, is then placed upon the shaft, and the whole are secured and made fast by the nut E, working on a screw cut on the shaft.

d, is a ring placed between the nut E, and the plate b'.

The proper inclination is given to the saws by the shape of the circular plates b, b'; these are thick at one edge and thin at the other, and the thick edge of one is placed opposite to the thin edge of the other.

The rasping wheel is mounted in a suitable frame, and driven at a high speed in any convenient manner. The wood, &c., to be rasped, is pressed against the face of the saws composing the rasping wheel.

We are aware that a saw of a helical form has been secured to a rotating cylinder for rasping purposes, that may be thought to resemble in principle our rasping machine in its operation. It will be perceived however, that the helical saw has almost insurmountable mechanical difficulties to overcome in properly securing the same to the cylinder. It is indispensible that the saw plate should be secured with great firmness, and that the strain should be equal and uniform in every part of the same; with a winding saw plate it is almost impossible to effect this; but by constructing a rasping wheel of a series of parallel rotary saw plates secured to the shaft in an oblique position thereto in the manner herein set forth, the greatest possible degree of stiffness can be given to them.

Having thus fully described the construction and operation of our improved machine for rasping dye-woods, roots, barks, &c., into powder, what we claim therein as new and desire to secure by Letters Patent, is—

The constructing the rasping wheel of a series of parallel circular saws secured to the shaft in an oblique position thereto, so that their rasping action will operate on the wood, to the right during one half their revolution and to the left during the other half, substantially in the manner and for the purpose herein set forth.

CHAS. W. ROBERTS.
JOHN HAMBLY.

Witnesses:
WALTER W. HART,
WILLIAM M. ROBERTS.